(12) United States Patent
Kim et al.

(10) Patent No.: US 11,436,744 B2
(45) Date of Patent: Sep. 6, 2022

(54) METHOD FOR ESTIMATING LANE INFORMATION, AND ELECTRONIC DEVICE

(71) Applicant: Samsung Electronics Co., Ltd., Suwon-si (KR)

(72) Inventors: Ji-man Kim, Suwon-si (KR); Chan-jong Park, Seoul (KR); Do-jun Yang, Yongin-si (KR); Hyun-woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 16/469,910

(22) PCT Filed: Dec. 15, 2017

(86) PCT No.: PCT/KR2017/014810
§ 371 (c)(1),
(2) Date: Jun. 14, 2019

(87) PCT Pub. No.: WO2018/117538
PCT Pub. Date: Jun. 28, 2018

(65) Prior Publication Data
US 2019/0318492 A1    Oct. 17, 2019

(30) Foreign Application Priority Data

Dec. 23, 2016  (KR) ........................ 10-2016-0178012
Oct. 30, 2017  (KR) ........................ 10-2017-0142567

(51) Int. Cl.
*G06T 7/536* (2017.01)
*B60W 50/00* (2006.01)
(Continued)

(52) U.S. Cl.
CPC ............. *G06T 7/536* (2017.01); *B60W 50/00* (2013.01); *G06K 9/6256* (2013.01); *G06T 7/60* (2013.01);
(Continued)

(58) Field of Classification Search
CPC . G06T 7/536; G06T 7/60; G06T 2207/20081; G06T 2207/20084;
(Continued)

(56) References Cited

U.S. PATENT DOCUMENTS 8,750,567 B2 *  6/2014  Zhang ..................... G06T 7/181
                                                           348/148
10,055,650 B2  8/2018  Yi et al.
(Continued)

FOREIGN PATENT DOCUMENTS

EP        3 088 268 A1   2/2016
KR   10-2013-0012629 A   2/2013
(Continued)

OTHER PUBLICATIONS

Fu, Xueyang, "Clearing the Skies: A deep network architecture for single-image rain removal", Sep. 7, 2016 (Year: 2016).*
(Continued)

*Primary Examiner* — Elaine Gort
*Assistant Examiner* — Matthias S Weisfeld
(74) *Attorney, Agent, or Firm* — Jefferson IP Law, LLP

(57) ABSTRACT

Provided is an Artificial Intelligence (AI) system for simulating a human brain's functions, such as recognition, decision, etc., by using a machine learning algorithm such as deep learning, etc. and applications of the AI system. Provided is an electronic device including: a camera configured to capture an outside image of a vehicle, and a processor configured to execute one or more instructions stored in a memory, wherein the processor executes the one or more
(Continued)

instructions to: determine, from the captured image, at least one object for estimating lane information; estimate, from the image, lane information of a road on which the vehicle is traveling, based on a distance between the determined at least one object and the vehicle and a vanishing point of the image; and output guide information for guiding driving of the vehicle based on the estimated lane information.

15 Claims, 12 Drawing Sheets

(51) Int. Cl.
    *G06K 9/62*     (2022.01)
    *G06T 7/60*     (2017.01)
    *G08G 1/16*     (2006.01)
    *G06V 20/56*     (2022.01)

(52) U.S. Cl.
    CPC .......... *G06V 20/588* (2022.01); *G08G 1/167* (2013.01); *B60W 2050/0014* (2013.01); *B60W 2420/42* (2013.01); *B60W 2520/10* (2013.01); *B60W 2552/00* (2020.02); *B60W 2554/00* (2020.02); *B60W 2554/4041* (2020.02); *B60W 2555/60* (2020.02); *G06T 2207/20081* (2013.01); *G06T 2207/20084* (2013.01); *G06T 2207/30236* (2013.01); *G06T 2207/30256* (2013.01)

(58) Field of Classification Search
    CPC .......... G06T 2207/30236; G06T 2207/30256; B60W 50/00; B60W 2554/4041; B60W 2552/00; B60W 2554/00; B60W 2555/60; B60W 2050/0014; B60W 2420/42; B60W 2520/10; G06K 9/00798; G06K 9/6256; G08G 1/167
    USPC ........................................................ 701/300
See application file for complete search history.

(56) References Cited

U.S. PATENT DOCUMENTS

| | | |
|---|---|---|
| 2014/0093131 A1 | 4/2014 | Fan et al. |
| 2014/0156158 A1* | 6/2014 | Matsuno ................ G08G 1/167 701/70 |
| 2017/0011270 A1* | 1/2017 | Kamada ................ G08G 1/0141 |
| 2018/0111614 A1* | 4/2018 | Nagae .................. B62D 15/029 |
| 2018/0165815 A1* | 6/2018 | Okada ........................ G06T 7/50 |
| 2018/0165822 A1* | 6/2018 | Uliyar ........................ G06T 7/80 |

FOREIGN PATENT DOCUMENTS

| | | |
|---|---|---|
| KR | 10-2014-0043280 A | 4/2014 |
| KR | 10-2014-0071174 A | 6/2014 |
| KR | 10-2015-0080834 A | 7/2015 |
| KR | 10-2015-0084234 A | 7/2015 |
| KR | 10-2015-0112656 A | 10/2015 |
| KR | 10-2015-0124889 A | 11/2015 |
| KR | 10-1582572 B1 | 1/2016 |
| KR | 10-1609303 B1 | 4/2016 |

OTHER PUBLICATIONS

International Search Report dated Mar. 26, 2018, issued in International Patent Application No. PCT/KR2017/014810.
European Search Report dated Dec. 19, 2019, Issued in European Application No. 17884410.6-1207 / 3543896.
Fu et al. Clearing the Skies: A deep network architecture for single-image rain removal. Laboratory of Sensing and Computing for Smart City, School of International Science and Engineering, Xiamen University.XP080724982 Sep. 7, 2016.
Huang et al. Finding Multiple lanes in urban road networks with vision and lidar. Springer Science+Business Media, LLC. XP019670021 Mar. 24, 2009.
Korean Office Action dated Sep. 8, 2021, issued in Korean Application No. 10-2017-0142567.

* cited by examiner

METHOD FOR ESTIMATING LANE INFORMATION, AND ELECTRONIC DEVICE

TECHNICAL FIELD

Various embodiments relate to a method and electronic device for estimating lane information, and more particularly, to a method and electronic device for estimating and outputting lane information even in bad weather.

BACKGROUND ART

An artificial intelligence (AI) system is a computer system for implementing human-level intelligence. Unlike existing rule-based smart systems, the AI system is a system in which machines learn, judge, and become smarter. The more the AI system is used, the higher the recognition rate of the AI system becomes so that the AI system can understand a user's tastes more accurately. For this reason, typical rule-based smart systems are being gradually replaced by deep learning-based AI systems.

AI technology consists of machine learning (deep learning) and element technology based on the machine learning.

The machine learning is algorithm technology that itself classifies/learns the characteristics of input data. The element technology uses a machine learning algorithm such as deep learning to imitate a human brain's functions such as recognition and determination. The machine learning is composed of technical fields including linguistic comprehension, visual comprehension, inference/prediction, knowledge representation, motion control, etc.

Various applications of the AI technology are as follows. The linguistic comprehension is technology for recognizing and applying/processing human language/characters, and includes natural language processing, machine translation, a dialogue system, query response, voice recognition/synthesis, etc. The visual comprehension is technology for recognizing/processing objects as done in human vision, and includes object recognition, object tracking, image search, human recognition, scene understanding, spatial understanding, and image enhancement. The inference/prediction is technology for judging and logically inferring and predicting information, and includes knowledge/probability-based inference, optimization prediction, preference-based planning, recommendation, etc. The knowledge representation is technology for automatically processing human experience information with knowledge data, and includes knowledge construction (data creation/classification), knowledge management (use of data), etc. The motion control is technology for controlling autonomous driving of vehicles, motions of robots, etc., and includes motion control (navigation, collision avoidance, driving), operating control (behavior control), etc.

Along with development of technologies that are applied to vehicles, various methods for an autonomous driving system (ADS) or an advanced driver assistance system (ADAS) are being developed.

Meanwhile, according to weather of a region where a vehicle is operated or a time at which the vehicle is operated, it is often the case that a driver cannot acquire sufficient visual information required for driving. Accordingly, there is demand for technology for providing information about a lane on which a vehicle is located to assist a driver with driving operations or for an ADS to safely control the vehicle in an environment where obstructions exist.

DESCRIPTION OF EMBODIMENTS

Technical Problem

Various embodiments are to provide a method and device for estimating lane information of a road, on which a vehicle is traveling, in an environment including a visibility obstruction such as bad weather.

BEST MODE

Figure 1:
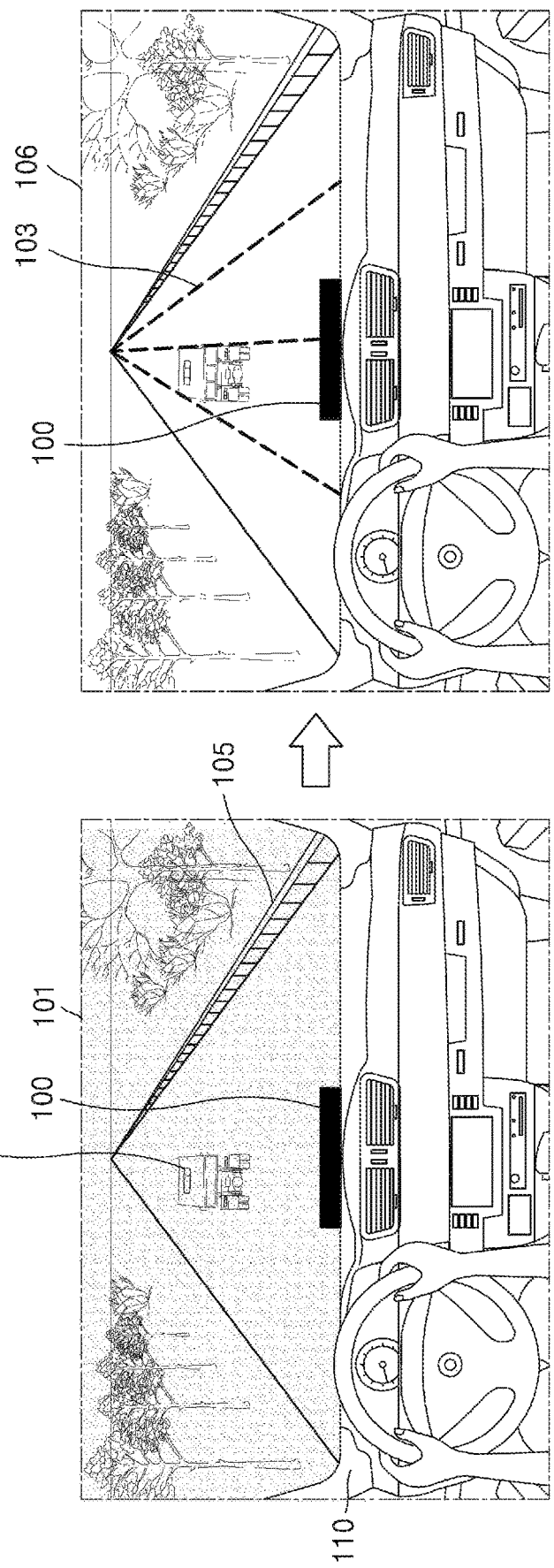
FIG. 1 is a schematic diagram showing an example of estimating lane information by an electronic device according to an embodiment.

An electronic device according to an embodiment includes: a camera configured to capture an outside image of a vehicle; a memory storing one or more instructions; and a processor configured to execute the one or more instructions stored in the memory, wherein the processor executes the one or more instructions to: determine, from the captured image, at least one object for estimating lane information; estimate, from the image, lane information of a road on which the vehicle is traveling, based on a distance between the determined at least one object and the vehicle and a vanishing point of the image; and output guide information for guiding driving of the vehicle based on the estimated lane information.

An operation method of an electronic device according to an embodiment includes: acquiring an outside image of the vehicle; determining, from the acquired image, at least one object for estimating lane information; estimating, from the image, lane information of a road on which the vehicle is traveling, based on a distance between the determined at least one object and the vehicle and a vanishing point of the image; and outputting guide information for guiding driving of the vehicle based on the estimated lane information.

A computer-readable recording medium storing a program for executing the above-described method on a computer.

Mode of Disclosure

Hereinafter, embodiments of the disclosure will be described in detail with reference to the accompanying drawings so that the disclosure may be readily implemented by those skilled in the art. However, the disclosure is not restricted by these embodiments but can be implemented in many different forms. Also, in the drawings, parts irrelevant to the description are omitted for the simplicity of explanation, and like reference numerals refer to like elements throughout the specification.

It will be understood that when a component is referred to as being "connected" to another component, it can be "directly connected" or "electrically connected" to the other component with an intervening component. Also, it will be understood that when a certain part "includes" a certain component, the part does not exclude another component but can further include another component, unless the context clearly dictates otherwise.

Hereinafter, the disclosure will be described in detail with reference to the accompanying drawings.

<FIG. 1>

FIG. 1 is a schematic diagram showing an example of estimating lane information by an electronic device according to an embodiment.

Referring to FIG. 1, according to an embodiment, an electronic device 100 may be installed in a vehicle 110 to estimate lane information 103 of a road on which the vehicle 110 is traveling, from an outside image 101 of the vehicle 110. Herein, the lane information 103 means lines that divide the road on which the vehicle 110 is traveling into lanes (e.g., a first lane and a second lane when the road is a two-lane road).

For example, the electronic device 100 may be a mobile or fixed electronic device that may be mounted on the vehicle 110. Also, the electronic device 100 may include a camera for acquiring the outside image 101 and a display module for outputting guide information. Also, the electronic device 100 may control other devices, such as a camera, a display 106, a local navigation, a GPS receiver, etc., included in the vehicle 110. Also, the electronic device 100 may communicate with other devices included in the vehicle 110 to receive data for estimating the lane information 103 or to transmit guide information.

When a driver drives the vehicle 110 in an environment including a visibility obstruction, the driver's clear view may be not secured. Furthermore, Autonomous Driving System (ADS) or Advanced Driver Assistance System (ADAS) of the vehicle 110 may operate not properly. The electronic device 100 may estimate the lane information 103 of the road on which the vehicle 110 is traveling, and output guide information as shown in FIG. 1, thereby assisting safe driving of the vehicle 110.

For example, the electronic device 100 may estimate the lane information 103 of the road on which the vehicle 110 is traveling by acquiring the outside image 101 of the vehicle 110. Also, the electronic device 100 may estimate the lane information 103 by using at least one object included in the image 101. Herein, the object may be a subject that is included in the image 101 and that may be recognized by being distinguished from other subjects in the image 101. For example, the image 101 may include at least one object, such as a guard rail 105 or a front vehicle 104. Also, the electronic device 100 may estimate the lane information 103 by using information obtained through analysis of the image 101, such as information about the number of lanes of the road, a vanishing point of the image 101, etc.

Meanwhile, according to an embodiment, the electronic device 100 may use a learning model to convert the image 101 acquired for estimating the lane information 103 such that the image 101 has visibility that is greater than or equal to a predetermined value. Also, according to an embodiment, the learning model for converting the image 101 may be based on learning according to Deep Neural Model (DNM) technology. The learning model may be an intelligence learning model.

According to an embodiment, the electronic device 100 may output guide information based on the estimated lane information 103. Herein, the guide information means information for guiding driving of the vehicle 110. For example, the guide information may include lane information of a road, driving speed of the vehicle 110, or danger warning information processed based on the driving speed of the vehicle 110.

Also, the electronic device 100 may include the display 106 for displaying the guide information. According to an embodiment, the display 106 may include at least one of a head-up display, a mirror display, and a transparent display.

Also, the electronic device 100 may control driving of the vehicle 110 based on ADS or ADAS.

According to an embodiment, the electronic device 100 may be a smart phone, a tablet PC, a smart PC, a mobile phone, personal digital assistant (PDA), a laptop, a media player, a micro server, a global positioning system (GPS) device, an e-book terminal, a terminal for digital broadcasting, a navigation, a kiosk, a MP3 player, a digital camera, a home appliance, or another computing device, although not limited thereto. Also, the electronic device 100 may be a wearable device, such as a watch, glasses, a hair band, and a ring, including a display function and a data processing function, although not limited thereto. Also, the electronic device 100 may include all kinds of devices that may process data and provide the processed data.

Meanwhile, in FIG. 1, the electronic device 100 acquires a front-view image of the vehicle 110 traveling, and estimates the lane information 103 of lanes ahead of the vehicle 110 by using the acquired image. However, the disclosure is not limited to the example of FIG. 1. For example, the electronic device 100 may acquire a rear-view image of the vehicle 110 traveling, and estimate the lane information 103 by using the acquired image. In this case, the electronic device 100 may provide rear lane information of the road on which the vehicle 110 is traveling to assist the driver's driving.

In FIG. 1, the electronic device 100 is shown to be separated from the vehicle 110, although not limited thereto. The electronic device 100 may be integrated into the vehicle 110 to be implemented as a component included in the vehicle 110. For example, the electronic device 100 may be implemented as a processor included in the vehicle 110. For example, the processor may include a micro controller unit (MCU) included in the vehicle 110. Also, the vehicle 110 may include a communication module that may communicate with a memory or an external device storing the lane information 103 and data required for operating the processor.

<FIG. 2>

Figure 2:
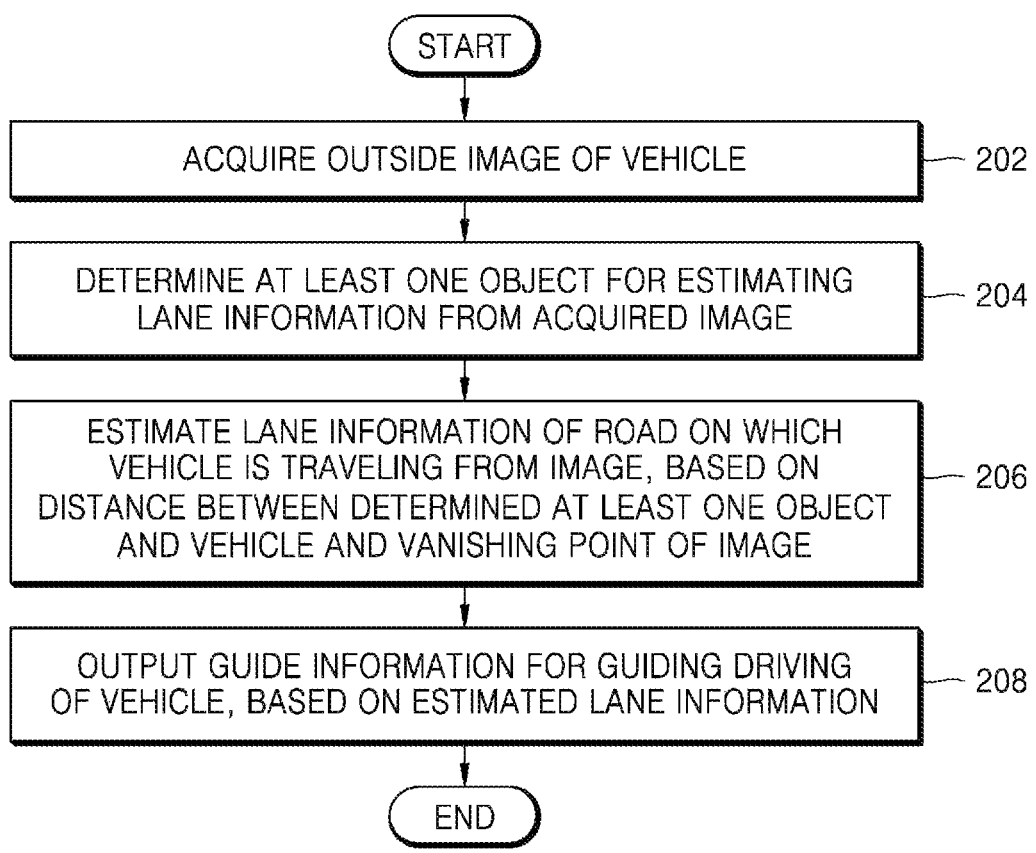
FIG. 2 is a flowchart showing an operation method of an electronic device according to an embodiment.

FIG. 2 is a flowchart showing an operation method of an electronic device according to an embodiment.

Referring to FIG. 2, in operation 202, the electronic device 100 may acquire an outside image of a vehicle. Herein, the outside image of the vehicle may be an image of a space that may be sensed by a camera or a sensor in an outside space of the vehicle. For example, the outside image of the vehicle may be an image showing a front view or a rear view of the vehicle, although not limited thereto.

According to an embodiment, the electronic device 100 may acquire an outside image of the vehicle by using a camera. For example, the camera may be a pinhole camera, a stereo camera, an infrared camera, or a thermal image camera, although not limited thereto. For example, the electronic device 100 may acquire the outside image of the vehicle by using a camera included in the electronic device 100, or may receive the outside image of the vehicle from a photographing device located outside the electronic device 100.

In operation 204, the electronic device 100 may determine at least one object for estimating lane information from the acquired image. For example, the electronic device 100 may analyse pixels included in the image to extract a plurality of objects as distinguished objects. The electronic device 100 may extract the objects from the image by using a learning model according to deep neural network (DNN) technology.

Also, the electronic device 100 may determine at least one object for estimating lane information from among the extracted objects. For example, the electronic device 100 may select a predetermined object from among the plurality of objects included in the image according to a lane information estimation method to determine the selected object as at least one object for estimating lane information. For example, the electronic device 100 may determine at least one among a guard rail, another vehicle traveling ahead, and another vehicle traveling behind, included in the image, as at least one object for estimating lane information.

According to an embodiment, the electronic device 100 may use a learning model according to the DNN technology to determine at least one object for estimating lane information from the acquired image. For example, the electronic device 100 may improve visibility of the image by using the learning model. Also, the electronic device 100 may determine at least one object for estimating lane information from the image whose visibility has been improved. Use of the learning model according to the DNN technology will be described in detail with reference to FIG. 3, later.

In operation 206, the electronic device 100 may estimate lane information of a road on which the vehicle is traveling from the image, based on a distance between the determined object and the vehicle and a vanishing point of the image.

According to an embodiment, the electronic device 100 may measure a distance between the determined object and the vehicle. For example, the electronic device 100 may measure a distance between the determined object and the vehicle by using a distance measuring sensor. Or, the electronic device 100 may measure a distance between the determined object and the vehicle based on experiment data stored in advance for specific types of objects and a size of a specific object included in the acquired image.

According to an embodiment, the electronic device 100 may predict a vanishing point of the image. For example, the electronic device 100 may extract straight lines through a lower end of a building, a guard rail, etc. among the objects included in the image to thereby predict a vanishing point. More specifically, the electronic device 100 may predict a point at which extension lines of a plurality of straight lines extracted from the image meet, as a vanishing point.

For example, the electronic device 100 may determine a road area based on a location of the determined object, and determine a lane width of each lane based on the distance between the determined object and the vehicle. Also, the electronic device 100 may divide the road area by the number of lanes by using the vanishing point of the image as a pivot to estimate lane information of the road.

Or, for example, the electronic device 100 may estimate a lane width based on the distance between the determined object and the vehicle. Also, the electronic device 100 may extend straight lines having the lane width estimated by using the vanishing point of the image as the pivot to thereby estimate lane information of the road.

In operation 208, the electronic device 100 may output guide information for guiding driving of the vehicle, based on the estimated lane information. For example, the electronic device 100 may synthesize the guide information with the road area of the acquired image to display the synthesized result. Or, the electronic device 100 may output the guide information as sound. For example, the electronic device 100 may determine whether a danger occurs on a traveling path of the vehicle, based on the guide information and predetermined criterion, and output the determined result as sound.

<FIG. 3>

Figure 3:
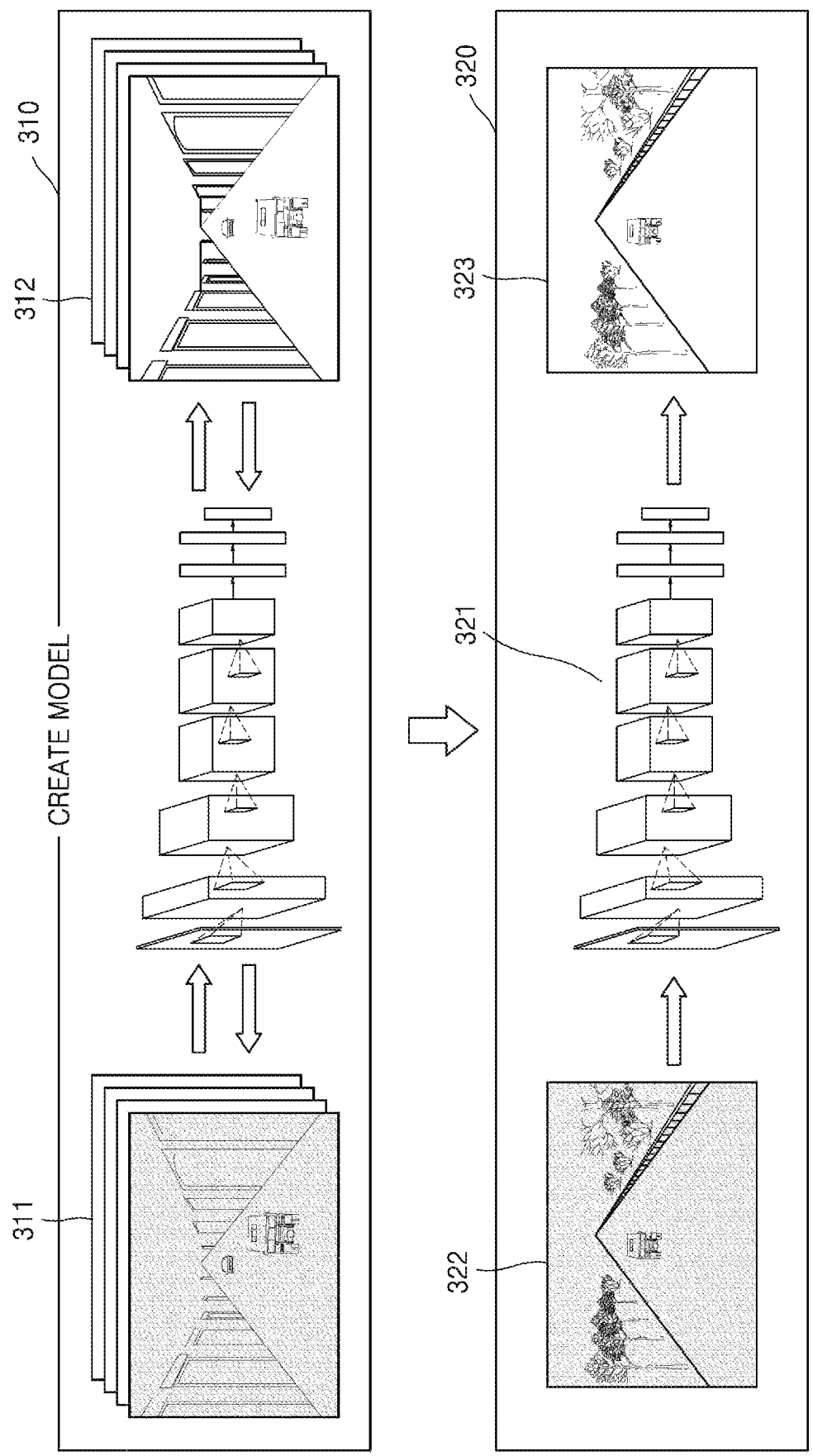
FIG. 3 is a diagram for describing a method of, performed by an electronic device, converting images, according to an embodiment.

FIG. 3 is a diagram for describing a method of, performed by an electronic device, converting images, according to an embodiment.

Referring to block 310 of FIG. 3, according to an embodiment, the electronic device 100 may acquire a learning model based on results obtained by learning a relationship between a plurality of images for the same subject. For example, the plurality of images for the same subject may be a plurality of images obtained by photographing the same object at the same location and at the same angle. For example, the relationship between the plurality of images may be difference values between pixels at the same location of the images.

For example, the electronic device 100 may create the learning model by learning a relationship between a plurality of pair images. Herein, the plurality of pair images may be a plurality of images 311 including a visibility obstruction (e.g., a low light level, a fog, yellow dust, etc.) and a plurality of images 312 including no visibility obstruction, the images 312 corresponding to the plurality of images 311.

According to another embodiment, the electronic device 100 may use a first learning model (not shown) for image analysis created in advance to create a second learning model 321 for image conversion. For example, the electronic device 100 may receive a first learning model for image analysis from another external electronic device (e.g., a server including a plurality of image analysis models). Also, the electronic device 100 may again learn the first learning model to create the second learning model 321 for image conversion.

For example, the electronic device 100 may create the second learning model 321 by using a difference between an output image obtained by passing an image 311 including a visibility obstruction through the first learning model and an image including no visibility obstruction.

Or, the electronic device 100 may receive the learned learning model 321 from the outside.

Also, according to an embodiment, the electronic device 100 may determine at least one object for estimating lane information from a converted image. In this case, the embodiments described above in operation 204 of FIG. 2 may be applied.

Referring to block 320 of FIG. 3, according to an embodiment, the electronic device 100 may use the learning model 321 acquired in block 310 to convert the acquired image such that the acquired image has visibility that is greater than or equal to a predetermined value. For example, the electronic device 100 may use the learning model 321 to increase visibility of an image including a visibility obstruction.

According to an embodiment, the learning model 321 may be a group of algorithms for extracting various attributes included in an image by using results of statistical machine learning and using the attributes to identify and/or determine objects included in the image. For example, when visibility of an image is determined to be smaller than the predetermined value, the learning model 321 may perform image conversion based on identifications and/or determinations on objects of the image.

According to an embodiment, the learning model 321 may be an end-to-end DNN model. Herein, the end-to-end DNN model means a learning model capable of converting an input image into an output image without post-processing.

For example, the electronic device 100 may input a first image 322 including a visibility obstruction to the acquired learning model 321 to convert the first image 322 into a second image 323. Herein, the second image 323 may be an image having visibility that is greater than or equal to the predetermined value.

For example, the learning model 321 may identify objects included in an image and process pixels included in each object to thereby convert the image such that visibility of the image is greater than or equal to the predetermined value.

According to an embodiment, the predetermined value may be determined according to the learning model 321. For example, the predetermined value may change when the learning model 321 is refined.

According to an embodiment, the electronic device 100 may convert an image into an image having visibility that is greater than or equal to the predetermined value by using the learning model 321, thereby increasing a degree of precision compared to a typical case of estimating lane information through analysis of an image including a visibility obstruction.

<FIG. 4>

Figure 4:
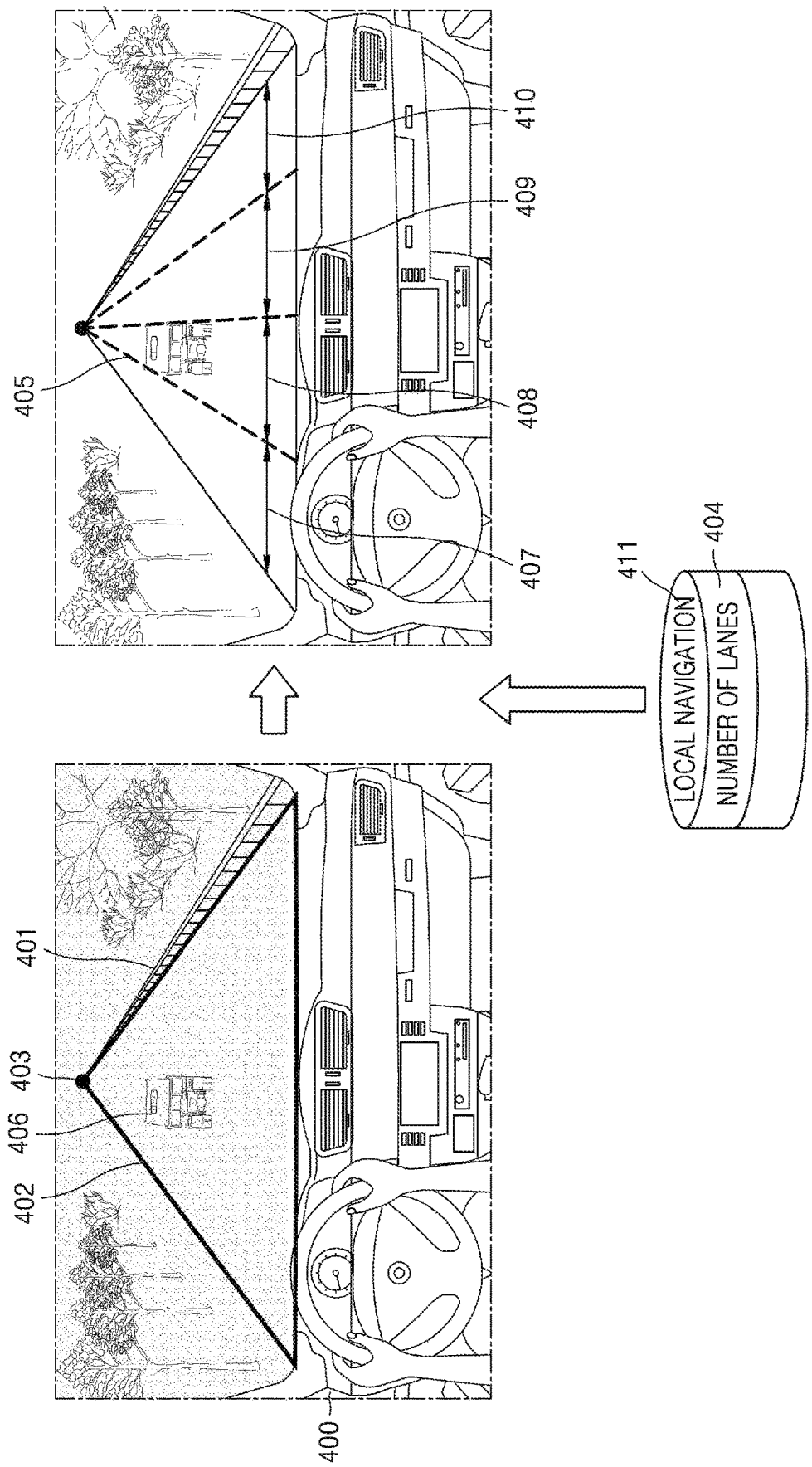
FIG. 4 is a diagram for describing a method of, performed by an electronic device, estimating lane information of a road, according to an embodiment.

FIG. 4 is a diagram for describing a method of, performed by an electronic device, estimating lane information of a road, according to an embodiment.

Referring to FIG. 4, according to an embodiment, the electronic device 100 may estimate lane information 405, based on information obtained through analysis of an acquired image and information 404 about the number of lanes of a road on which a vehicle is traveling. For example, the information obtained through analysis of the image may include at least one object, such as a vanishing point of the image, a road area, a guard rail, or a front vehicle, although not limited thereto.

According to an embodiment, the electronic device 100 may determine a road area 402 from the acquired image. For example, the electronic device 100 may determine the road area 402, based on a location and height of a guard rail 401 among a plurality of objects included in the image, acquired through analysis of the image.

According to an embodiment, the electronic device 100 may acquire information 404 about the number of lanes of a road on which a vehicle 400 is traveling, based on position information of the vehicle 400. For example, the electronic device 100 may acquire the information 404 about the number of lanes of the road on which the vehicle 400 is traveling, based on position information of the vehicle 400 acquired through Global Positioning System (GPS). For example, the electronic device 100 may acquire the information 404 about the number of lanes of the road on which the vehicle 400 is traveling, from a local navigation 411 included in the vehicle 400. Or, the electronic device 100 may acquire information 404 about the number of lanes stored in advance in the electronic device 100, based on position information of the vehicle 400.

According to an embodiment, the electronic device 100 may estimate lane widths 407 to 410 for the individual lanes of the road on which the vehicle 400 is traveling, based on a distance between the vehicle 400 and a front vehicle 406 determined from the image, the determined road area 402, and the acquired information 404 about the number of lanes. For example, when the information 404 about the number of lanes indicates a four-lane road, the electronic device 100 may divide the road area 402 into four lanes. Also, the electronic device 100 may determine a ratio of the lanes divided according to the information 404 about the number of lanes with respect to the road area 402, based on the distance between the front vehicle 406 and the vehicle 400. More specifically, the electronic device 100 may determine a ratio of a first lane, a second lane, a third lane, and a fourth lane as 1.1:1.2:1.2:1.0:1.1. Also, the electronic device 100 may estimate the lane widths 407 to 410 based on the determined ratio.

According to an embodiment, the electronic device 100 may estimate the lane widths 407 to 410 by referring to experiment data values stored in advance. For example, the experiment data values stored in advance may be information about a ratio of lane widths matching with the distance between the front vehicle 406 and the vehicle 400 and the information 404 about the number of lanes, when the road area 402 is 1.

According to an embodiment, the electronic device 100 may estimate a vanishing point of the image. Also, the embodiments described above in operation 206 of FIG. 2 may be applied to a method of determining the distance between the front vehicle 406 and the vehicle 400 by the electronic device 100 and a method of determining the vanishing point 403 of the image by the electronic device 100.

According to an embodiment, the electronic device 100 may estimate the lane information 405 of the road on which the vehicle 400 is traveling, based on the estimated lane widths 407 to 410 and the estimated vanishing point 403 of the image. For example, the electronic device 100 may extend straight lines of dividing the road area 402 into lanes by using the vanishing point of the image as the pivot, based on the estimated lane widths 407 to 410, thereby estimating the lane information 405.

According to an embodiment, when the electronic device 100 uses the information 404 about the number of lanes stored in advance in the vehicle 400, the electronic device 100 may estimate the lane information 405 through analysis of the acquired image without having to access a data server located outside the vehicle 400.

<FIG. 5>

Figure 5:
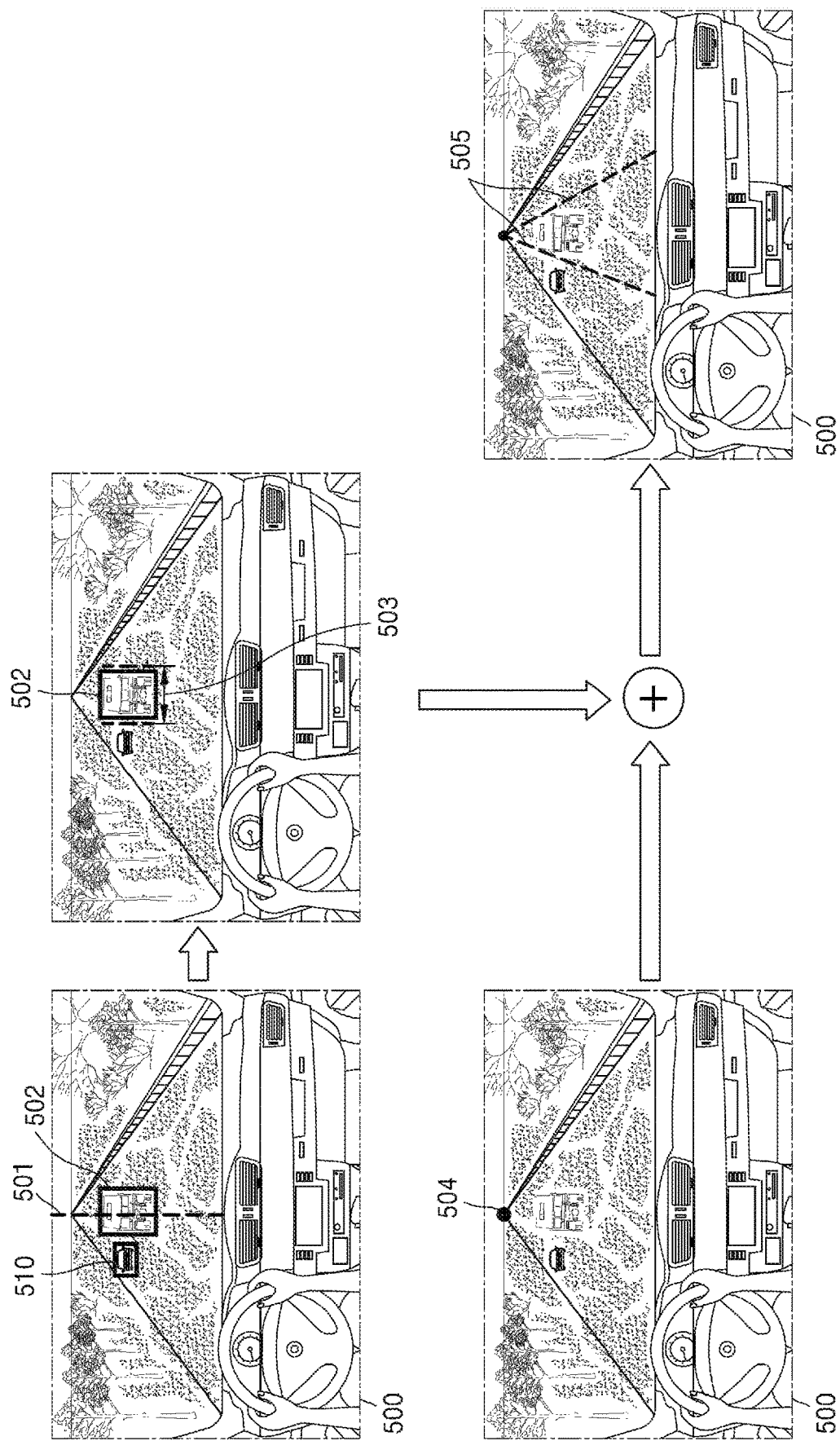
FIG. 5 is a diagram for describing a method of, performed by an electronic device, estimating lane information of a road, according to an embodiment.

FIG. 5 is a diagram for describing a method of, performed by an electronic device, estimating lane information of a road, according to an embodiment.

Referring to FIG. 5, according to an embodiment, the electronic device 100 may estimate lane information of a road based on a first front vehicle 502 located on a traveling center line 501 of a vehicle 500.

According to an embodiment, the electronic device 100 may determine the traveling centre line 501 of the vehicle 500. Herein, the traveling center line 501 may be a center line of the vehicle 500 traveling, which means a center line of an image acquired through a camera.

According to an embodiment, the electronic device 100 may determine the first front vehicle 502 located on the travelling center line 501 as at least one object for estimating lane information.

According to an embodiment, the electronic device 100 may estimate a first lane width 503 of a first lane on which the vehicle 500 is traveling, based on a distance between the first front vehicle 502 and the vehicle 500 and a vehicle width of the first front vehicle 502. Herein, the vehicle width of the first front vehicle 502 means a horizontal size of the first front vehicle 502 detected from an acquired image. For example, the vehicle width may be represented in units of pixels.

For example, the electronic device 100 may determine a distance between the first front vehicle 502 and the vehicle 500 based on a size of the first front vehicle 502 detected from an image by using experiment data stored in advance.

For example, the electronic device 100 may estimate a sum of the vehicle width of the first front vehicle 502 and a first value as the first lane width 503 of the first lane. Also, the first value may be determined according to the distance between the first front vehicle 502 and the vehicle 500. For example, the first value may be set according to experiment data stored in advance in the electronic device 100.

Also, the electronic device 100 may estimate lane information 505 of the road on which the vehicle 500 is traveling, based on the estimated first lane width 503 and the vanishing point 504 of the image. For example, the electronic device 100 may extend straight lines passing the vanishing point of the image based on the first lane width 503 estimated by using the traveling center line 501 of the image or the first front vehicle 502, thereby estimating the lane information 505.

Meanwhile, according to an embodiment, the electronic device 100 may estimate a line of another lane (e.g., a second lane on which a second front vehicle 510 is traveling) which is different from the lane on which the vehicle 500 is traveling, by using the similar method.

For example, the electronic device 100 may determine the second front vehicle 510 which is not located on the traveling center line 501, as at least one object.

Also, the electronic device 100 may estimate a second lane width of the second lane, based on a distance between the second front vehicle 510 and the traveling center line 501, a distance between the second front vehicle 510 and the vehicle 500, and a vehicle width of the second front vehicle 510. For example, the electronic device 100 may estimate a sum of the vehicle width of the second front vehicle 510 and a second value as a second lane width of the second lane. Also, the second value may be determined according to the distance between the second front vehicle 510 and the traveling center line 501 and the distance between the second front vehicle 510 and the vehicle 500.

Also, the electronic device 100 may estimate lane information of the second lane based on the estimated second lane width and the vanishing point of the image. For example, the electronic device 100 may extend straight lines passing the vanishing point of the image based on the second lane width estimated by using the traveling center line 501 of the image or the second front vehicle 510, thereby estimating lane information of the second lane.

Also, according to an embodiment, the electronic device 100 may output lane information including the lane information of the lane on which the second front vehicle 510 is traveling and the lane information 505 of the lane on which the first front vehicle 502 is traveling, as guide information.

<FIG. 6>

Figure 6:
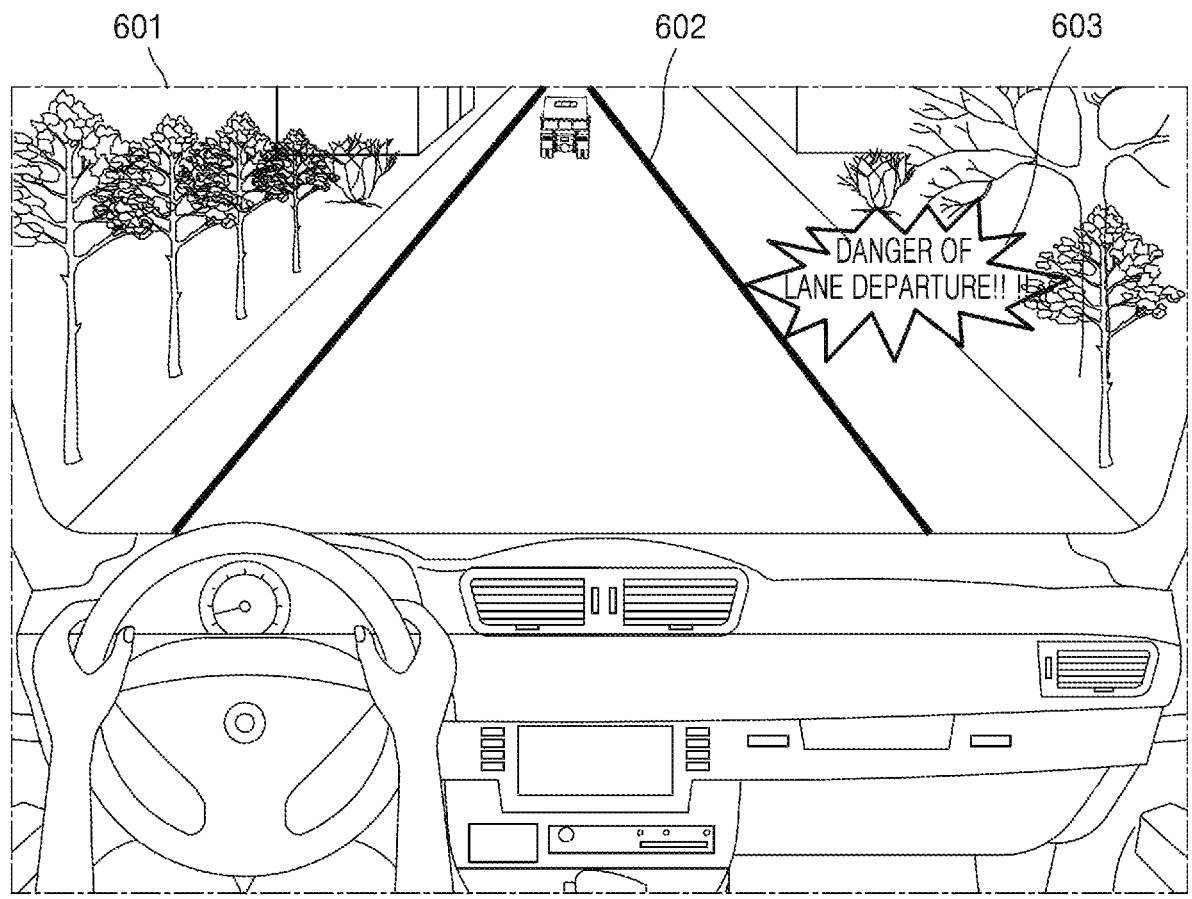
FIG. 6 is a diagram for describing a method of, performed by an electronic device, outputting guide information, according to an embodiment.

FIG. 6 is a diagram for describing a method of, performed by an electronic device, outputting guide information of a road, according to an embodiment.

Meanwhile, according to an embodiment, the electronic device 100 may create guide information based on estimated lane information. For example, the guide information may be obtained by imaging the estimated lane information. For example, the guide information may be processed by the electronic device 100 based on the estimated lane information and driving information of a vehicle. For example, the electronic device 100 may create the guide information based on the estimated lane information and driving speed of the vehicle.

Referring to FIG. 6, according to an embodiment, the electronic device 100 may output imaged lane information. For example, the electronic device 100 may display a lane 602 of a road on which the vehicle is traveling, on a display 601 (e.g., a head-up display or a transparent display installed in a front portion of the vehicle) included in the vehicle, based on the estimated lane information. For example, the electronic device 100 may display an acquired image on the display 601, and highlight the estimated lane 602 in the acquired image.

According to an embodiment, the guide information may be danger warning information processed by using the estimated lane information. For example, the electronic device 100 may predict a traveling route of the vehicle based on a driving direction, speed, etc. of the vehicle, and determine whether there is a danger of lane departure, based on the estimated lane information. Also, when the electronic device 100 determines that there is a danger of lane departure, the electronic device 100 may output the corresponding guide information as sound.

Referring to FIG. 6, for example, the electronic device 100 may output danger warning information 603 created based on lane information. For example, when the electronic device 100 determines that there is a danger of lane departure, the electronic device 100 may output the danger warning information 603 on a display included in the vehicle. For example, the electronic device 100 may provide text, an image, an animation, etc. representing the danger warning information 603.

According to an embodiment, the electronic device 100 may determine whether a position of the vehicle is included in a predetermined range, based on the estimated lane information. Also, the electronic device 100 may output guide information based on the determined result. Herein, the predetermined range may be a position range of the vehicle that is estimated when the vehicle is traveling in a lane.

For example, the electronic device 100 may use a center line of an image to determine whether the position of the vehicle is included in the predetermined range. When a location of a lane estimated from a center line of an acquired image deviates from a safety range, the electronic device 100 may determine that a traveling route of the vehicle has departed from the lane. For example, the safety range may have been set in advance in the electronic device 100 based on experiment data.

Also, when the position of the vehicle is not included in the predetermined range, the electronic device 100 may output guide information such as the danger warning information 603.

According to an embodiment, by outputting guide information, the electronic device 100 may enable a driver to drive the vehicle safely even when a visibility obstruction exists in a driving environment. Also, because guide information is output in various forms upon the driver's driving, the driver's satisfaction in driving may increase.

Figure 7:
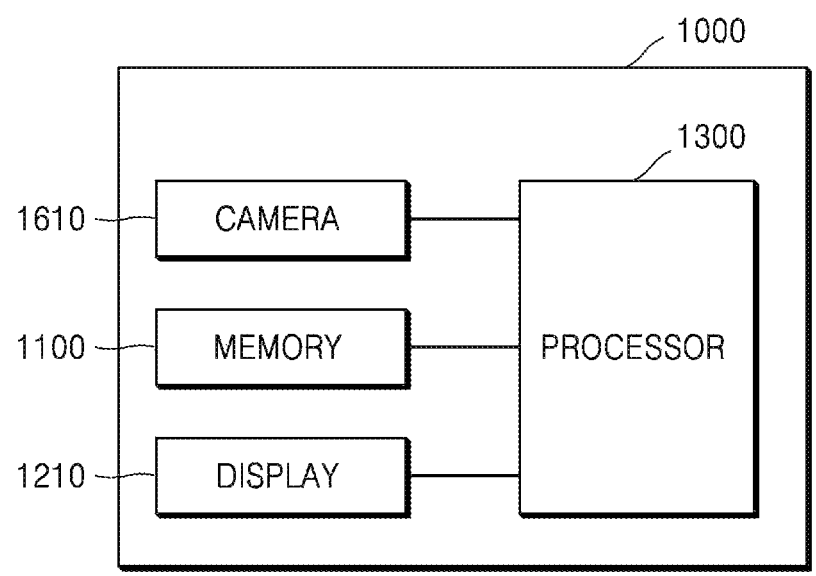
FIGS. 7 and 8 are block diagrams showing a configuration of an electronic device according to an embodiment.
Figure 8:
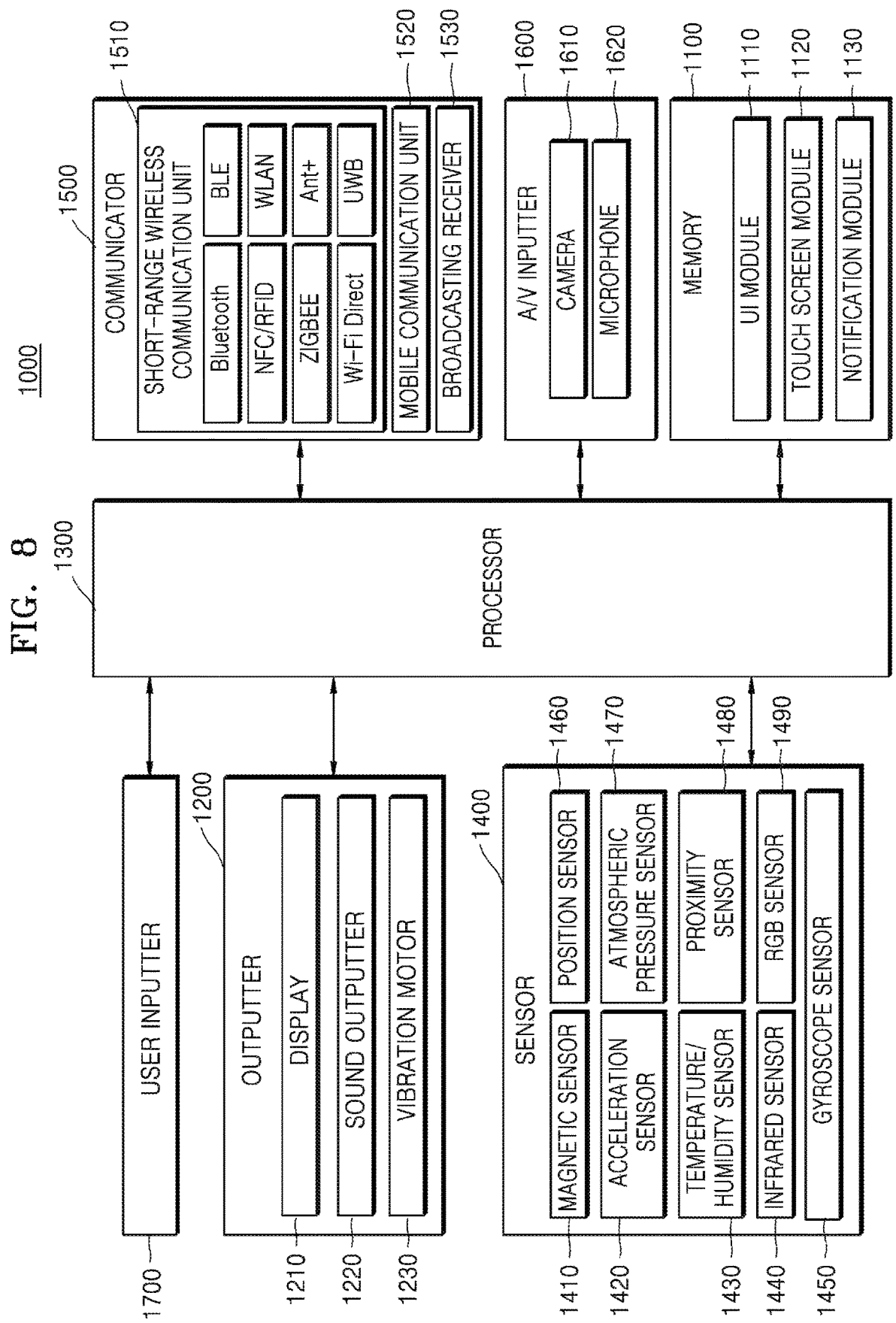

<FIGS. 7 and 8>

FIGS. 7 and 8 are block diagrams showing a configuration of an electronic device according to an embodiment.

As shown in FIG. 7, an electronic device 1000 according to an embodiment may include a memory 1100, a display 1210, a camera 1610, and a processor 1300.

However, all of the components shown in FIG. 7 may be not essential components of the electronic device 1000. The electronic device 1000 may be configured with more components than those shown in FIG. 7 or with less components than those shown in FIG. 7.

For example, as shown in FIG. 8, the electronic device 1000 according to an embodiment may further include an outputter 1200, a communicator 1500, a sensor 1400, an Audio/Video (A/V) inputter 1600, and a user inputter 1700, in addition to the memory 1100, the display 1210, the camera 1610, and the processor 1300.

The memory 1100 may store programs for processing and control of the processor 1300, and also store images input to the electronic device 1000 or guide information that is to be output from the electronic device 1000. Also, the memory 1100 may store specific information for determining whether to output guide information.

The memory 1100 may include at least one type of storage medium among a flash memory type, a hard disk type, a multimedia card micro type, a card type memory (e.g., SD or XD memory), Random Access Memory (RAM), Static Random Access Memory (SRAM), Read Only Memory (ROM), Electrically Erasable Programmable Read-Only Memory (EEPROM), Programmable Read-Only Memory (PROM), a magnetic memory, a magnetic disk, and an optical disk.

The programs stored in the memory 1100 may be classified into a plurality of modules according to their functions, and for example, the programs may be classified into a User Interface (UI) module 1110, a touch screen module 1120, a notification module 1130, etc.

The UI module 1110 may provide a specialized UI or GUI interworking with the electronic device 1000 for each application. The touch screen module 1120 may sense a user's touch gesture made on a touch screen, and transfer information about the user's touch gesture to the processor 1300. The touch screen module 1120 according to an embodiment may recognize a touch code and analyse it. The touch screen module 1120 may be configured with separate hardware including a controller.

The notification module 1130 may generate a signal for notifying event occurrence of the electronic device 1000. Examples of events that occur in the electronic device 1000 may be call signal reception, message reception, a key signal input, schedule notification, etc. The notification module 1130 may output a notification signal in the form of a video signal through the display 1210, in the form of an audio signal through a sound outputter 1220, or in the form of a vibration signal through a vibration motor 1230. For example, the notification module 1130 may generate a signal for outputting guide information based on estimated lane information.

The outputter 1200 may output an audio signal, a video signal or a vibration signal, and the outputter 1200 may include the display 1210, the sound outputter 1220, and the vibration motor 1230.

The display 1210 may display information processed in the electronic device 1000. More specifically, the display 1210 may output an image captured by the camera 1610. Also, the display 1210 may synthesize guide information created by the processor 1300 with the captured image and output the synthesized result.

Also, the display 1210 may display a user interface for executing an operation related to a response, in response to the user's input.

The sound outputter 1220 may output audio data received from the communicator 1500 or stored in the memory 1100. Also, the sound outputter 1220 may output a sound signal related to a function (e.g., call signal ringtone, message ringtone, and notification sound) that is performed in the electronic device 1000. For example, the sound outputter 1220 may output guide information generated as a signal by the notification module 1130, as a sound signal, by the control of the processor 1300.

The processor 1300 may generally control all operations of the electronic device 1000. For example, the processor 1300 may execute the programs stored in the memory 1100 to control all operations of the user inputter 1700, the outputter 1200, the sensor 1400, the communicator 1500, the A/V inputter 1600, etc. Also, the processor 1300 may execute the programs stored in the memory 1100 to perform functions of the electronic device 1000 shown in FIGS. 1 to 6.

More specifically, the processor 1300 may execute one or more instructions stored in the memory 1100 to control the camera 1610 to capture an outside image of the vehicle. Or, the processor 1300 may execute one or more instructions stored in the memory 1100 to control the communicator 1500 to acquire an outside image of the vehicle.

Also, the processor 1300 may execute one or more instructions stored in the memory 1100 to determine at least one object for estimating lane information from the captured image. For example, the processor 1300 may determine a guard rail, a front vehicle, a rear vehicle, etc. included in the image as at least one object for estimating lane information.

Also, the processor 1300 may execute one or more instructions stored in the memory 1100, to estimate lane information of a road on which the vehicle is traveling in the image, based on a distance between the determined at least one object and the vehicle and a vanishing point of the image. For example, the processor 1300 may execute one or more instructions stored in the memory 1100 to acquire a distance between the determined at least one object and the vehicle through the sensor 1400. Also, the processor 1300 may extract straight lines through a lower end of a building, a guard rail, etc. among objects included in the image to thereby predict a vanishing point.

For example, the processor 1300 may determine a road area based on the distance between the determined object and the vehicle. Also, the processor 1300 may divide the road area by the number of lanes by using the vanishing point of the image as a pivot to estimate lane information of the road.

Or, for example, the processor 1300 may estimate a lane width based on the distance between the determined object and the vehicle. Also, the processor 1300 may extend straight lines having the estimated lane width by using the vanishing point of the image as a pivot, thereby estimating lane information of the road.

According to an embodiment, the processor 1300 may execute one or more instructions stored in the memory 1100 to determine a road area from the captured image. Also, the processor 1300 may acquire information about the number of lanes of the road on which the vehicle is traveling, based on position information of the vehicle. For example, the processor 1300 may execute one or more instructions stored in the memory 1100 to control a position sensor 1460 to acquire GPS information of the vehicle. Also, the processor 1300 may estimate a lane width from the image, based on the distance between the determined at least one object and the vehicle, the determined road area, and the acquired information about the number of lanes. Also, the processor 1300 may estimate lane information of the road on which the vehicle is traveling from the image, based on the estimated lane width and the vanishing point of the image.

According to an embodiment, the processor 1300 may execute one or more instructions stored in the memory 1100 to determine a traveling center line of the vehicle. Also, the processor 1300 may execute one or more instructions stored in the memory 1100 to determine a first front vehicle located on the traveling center line as at least one object for estimating lane information. Also, the processor 1300 may execute one or more instructions stored in the memory 1100 to estimate a first lane width of a first lane on which the vehicle is traveling in the image based on the distance between the first front vehicle and the vehicle and the vehicle width of the first front vehicle. Also, the processor 1300 may execute one or more instructions stored in the memory 1100 to estimate lane information of the road on which the vehicle is traveling in the image, based on the estimated first lane width and the vanishing point of the image.

Also, the processor 1300 may determine a second front vehicle that is not located on the traveling center line, as at least one object for estimating lane information. Also, the processor 1300 may estimate a second lane width of a second lane on which the second front vehicle is traveling, based on a distance between the second front vehicle and the traveling center line, a distance between the second front vehicle and the vehicle, and a vehicle width of the second front vehicle. Also, the processor 1300 may estimate lane information of the road on which the vehicle is traveling in the image, based on the estimated second lane width and the vanishing point of the image.

According to an embodiment, the processor 1300 may learn a relationship between a plurality of images for the same subject. Also, the processor 1300 may execute one or more instructions stored in the memory 1100 to create a learning model based on the learned result. Also, the processor 1300 may execute one or more instructions stored in the memory 1100 to convert the captured image using the learning model such that the captured image has visibility that is greater than or equal to a predetermined value. Also, the processor 1300 may execute one or more instructions stored in the memory 1100 to estimate lane information of the road on which the vehicle is traveling by using the converted image. For example, the processor 1300 may determine at least one object for estimating lane information from the converted image.

According to an embodiment, the processor 1300 may execute one or more instructions stored in the memory 1100 to control the outputter 1200 to output guide information for guiding driving of the vehicle based on the estimated lane information. For example, the processor 1300 may execute one or more instructions stored in the memory 1100 to control the display 1210 to synthesize the guide information with the road area of the acquired image and to display the synthesized result. Or, the processor 1300 may execute one or more instructions stored in the memory 1100 to control the sound outputter 1220 to output the guide information. For example, the processor 1300 may execute one or more instructions stored in the memory 1100 to determine whether a danger occurs on a traveling route of the vehicle based on the guide information and predetermined criterion, and to control the sound outputter 1220 or the vibration motor 1230 to output the determined result.

According to an embodiment, the processor 1300 may generate guide information. For example, the processor 1300 may create guide information based on the estimated lane information and driving speed of the vehicle. For example, the processor 1300 may determine whether a position of the vehicle is included in a predetermined range, based on the estimated lane information, thereby creating guide information.

The sensor 1400 may sense a state of the electronic device 1000 or a state of surroundings of the electronic device 1000, and transfer the sensed information to the processor 1300.

The sensor 1400 may include at least one among a magnetic sensor 1410, an acceleration sensor 1420, a temperature/humidity sensor 1430, an infrared sensor 1440, a gyroscope sensor 1450, the position sensor (e.g., GPS) 1460, an atmospheric pressure sensor 1470, a proximity sensor 1480, and a RGB sensor 1490, although not limited thereto. Functions of the individual sensors are intuitively inferred by one of ordinary skill in the art from their names, and therefore, detailed descriptions thereof will be omitted.

According to an embodiment, the sensor 1400 may measure a distance between the at least one object determined from the captured image and the vehicle.

The communicator 1500 may include one or more components for enabling the electronic device 1000 to communicate with another device (not shown) and a server (not shown). The other device (not shown) may be a computing device such as the electronic device 1000 or a sensor, although not limited thereto. For example, the communicator 1500 may include a short-range wireless communication unit 1510, a mobile communication unit 1520, and a broadcasting receiver 1530.

The short-range wireless communication unit 1510 may include a Bluetooth communication unit, a Bluetooth Low Energy (BLE) communication unit, a Near-Field Communication (NFC) unit, a Wireless Local Access Network (WLAN: Wi-Fi) communication unit, a Zigbee communication unit, an Infrared Data Association (IrDA) communication unit, a Wi-Fi Direct (WFD) communication unit, a Ultra Wideband (UWB) communication module, and an Ant+ communication unit, although not limited thereto. For example, the short-range wireless communication unit 1510 may receive information about the number of lanes from a navigation included in the vehicle through short-range wireless communication.

The mobile communication unit 1520 may transmit/receive a wireless signal to/from at least one of a base station, an external terminal, and a server on a mobile communication network. Herein, the wireless signal may include a voice call signal, a video call signal or various formats of data according to transmission/reception of text/multimedia messages.

The broadcasting receiver 1530 may receive a broadcasting signal and/or broadcasting-related information from the outside through a broadcasting channel. The broadcasting channel may include a satellite channel and a terrestrial channel According to implementation examples, the electronic device 1000 may not include the broadcasting receiver 1530.

The A/V inputter 1600 may enable a user to input an audio signal or a video signal, and may include the camera 1610 and the microphone 1620. The camera 1610 may acquire an image frame, such as a still image or a moving image, through an image sensor in a video call mode or a photographing mode. An image captured by the image sensor may be processed by the processor 1300 or a separate image processor (not shown).

According to an embodiment, the camera 1610 may capture an outside image of the vehicle. For example, the camera 1610 may capture a front image of the vehicle traveling, although not limited thereto.

The microphone 1620 may receive a sound signal from the outside and process the sound signal into electrical voice data. For example, the microphone 1620 may receive a sound signal from an external device or a user. The microphone 1620 may receive a user's voice input. The microphone 1620 may use various noise removal algorithms to remove noise generated upon receiving a sound signal from the outside.

The user inputter 1700 may be means to enable the user to input data for controlling the electronic device 1000. For example, the user inputter 1700 may include a key pad, a dome switch, a touch pad (a capacitive type, a resistive type, an infrared beam type, a surface acoustic wave type, an integral strain gauge type, a piezo effect type, etc.), a jog wheel, a jog switch, etc., although not limited thereto.

<FIGS. 9 to 12>

Figure 9:
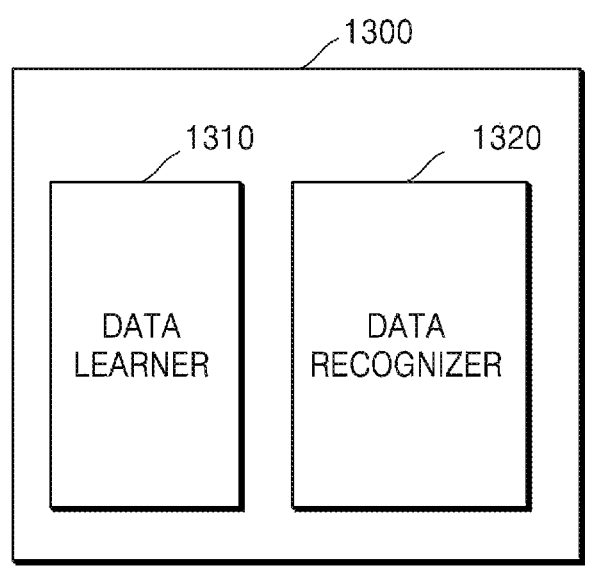
FIG. 9 is a block diagram of a processor according to an embodiment.

FIG. 9 is a block diagram of a processor according to an embodiment.

Referring to FIG. 9, the processor 1300 according to an embodiment may include a data learner 1310 and a data recognizer 1320.

The data learner 1310 may learn criterion for increasing visibility of an image. The data learner 1310 may learn criterion related to what data will be used to increase visibility of an image and how to increase visibility of an image using data. The data learner 1310 may acquire data that is to be used for learning, and apply the acquired data to a data determination model which will be described later, thereby learning criterion for increasing visibility of an image.

The data recognizer 1320 may increase visibility of an input image. The data recognizer 1320 may increase visibility of the input image by using the learned data determination model. The data recognizer 1320 may acquire predetermined data according to predetermined criterion obtained by learning, and apply the data determination model of using the acquired data as an input value to thereby increase visibility of the input image. Also, a result value output by the data determination model of using the acquired data as an input value may be used to refine the data determination model.

At least one of the data learner 1310 and the data recognizer 1320 may be manufactured in the form of at least one hardware chip and mounted on the electronic device. For example, at least one of the data learner 1310 and the data recognizer 1320 may be manufactured in the form of a dedicated hardware chip for artificial intelligence (AI) or as a part of a typical general-purpose processor (e.g., CPU or application processor) or a graphic dedicated processor (e.g., GPU) and mounted on various electronic devices as described above.

In this case, the data learner 1310 and the data recognizer 1320 may be mounted on a single electronic device or on different electronic devices. For example, one of the data learner 1310 and the data recognizer 1320 may be included in the electronic device and the other one may be included in a server. Also, the data learner 1310 may provide model information constructed by itself to the data recognizer 1320 in a wired or wireless manner, and data input to the data recognizer 1320 may be provided as additional training data to the data learner 1310.

Meanwhile, at least one of the data learner 1310 and the data recognizer 1320 may be implemented as a software module. When at least one of the data learner 1310 and the data recognizer 1320 is implemented as a software module (or, a program module including an instruction), the software module may be stored in non-transitory computer readable media. Also, in this case, the at least one software module may be provided by Operating System (OS) or by a predetermined application. Or, a part of the at least one software module may be provided by OS and the other part may be provided by the predetermined application.

Figure 10:
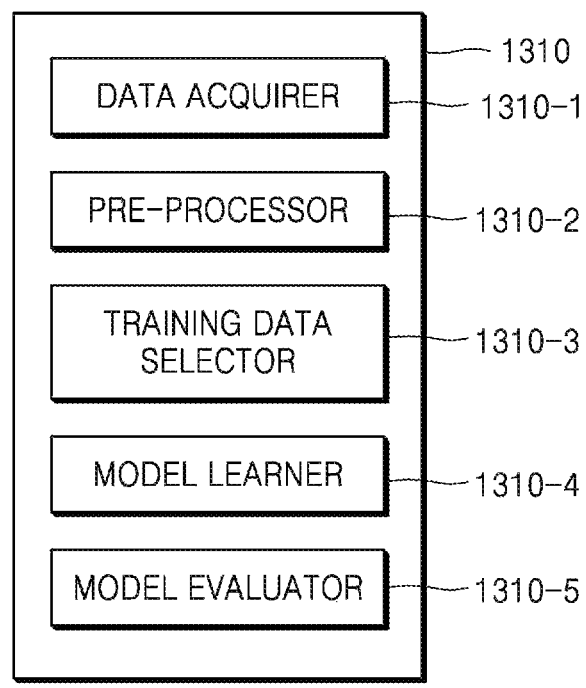
FIG. 10 is a block diagram of a data learner according to an embodiment.

FIG. 10 is a block diagram of a data learner according to an embodiment.

Referring to FIG. 10, the data learner 1310 according to an embodiment may include a data acquirer 1310-1, a pre-processor 1310-2, a training data selector 1310-3, a model learner 1310-4, and a model evaluator 1310-5.

The data acquirer 1310-1 may acquire data required for determining a situation. The data acquirer 1310-1 may acquire data required for learning to determine a situation.

The data acquirer 1310-1 may receive a plurality of images for the same subject. For example, the data acquirer 1310-1 may receive images obtained by photographing the same road at the same place at different times, in different days, and in different seasons. The data acquirer 1310-1 may receive the images through a camera of an electronic device including the data learner 1310. Or, the data acquirer 1310-1 may acquire data through an external device capable of communicating with the electronic device.

The pre-processor 1310-2 may pre-process the acquired data such that the acquired data is used for learning to determine a situation. The pre-processor 1310-2 may process the acquired data into a predetermined format such that the model learner 1310-4 which will be described later uses the acquired data for learning to determine a situation. For example, the pre-processor 1310-2 may divide a plurality of acquired images in units of pixels to analyse the plurality of acquired images. Or, the pre-processor 1310-2 may extract an object from each of a plurality of acquired images to analyse the plurality of acquired images. Also, the pre-processor 1310-2 may process the extracted object into data. Also, the pre-processor 1310-2 may tag objects or pixels located at the same location in the images to classify the objects or pixels.

The training data selector 1310-3 may select data required for learning from among the pre-processed data. The selected data may be provided to the model learner 1310-4. The training data selector 1310-3 may select data required for learning from among the pre-processed data according to predetermined criterion for determining a situation. Also, the training data selector 1310-3 may select data according to criterion by learning of the model learner 1310-4 which will be described later.

The training data selector 1310-3 may select data required for learning from among data processed by the pre-processor 1310-2. For example, the training data selector 1310-3 may select data corresponding to a specific object in an image to learn criterion for increasing visibility of the specific object.

The model learner 1310-4 may learn criterion for a determination of a situation based on training data. Also, the model learner 1310-4 may learn criterion for what training data will be used to determine a situation.

For example, the model learner 1310-4 may analyse characteristics of each object or pixel to learn criterion for increasing visibility of an image. Or, the model learner 1310-4 may analyse a relationship between images by using a pair of pair images to learn criterion for increasing visibility of the images. For example, the model learner 1310-4 may extract a difference between images by using a pair of images to thereby analyse a relationship.

Also, the model learner 1310-4 may learn a data determination model that is used to determine a situation by using training data. In this case, the data determination model may have been constructed in advance. For example, the data determination model may have been constructed in advance by receiving basic training data (e.g., a sample image, etc.).

The data determination model may be constructed by considering an application field of the data determination model, a purpose of learning, a computing performance of a device, etc. The data determination model may be a model based on a neural network. For example, a model, such as a DNN, a Recurrent Neural Network (RNN), a Bidirectional Recurrent Deep Neural Network (BRDNN), may be used as the data determination model, although not limited thereto.

According to various embodiments, when there are a plurality of data determination models constructed in advance, the model learner 1310-4 may determine a data determination model having a high relevance between input training data and basic training data as a data determination model that is to be learned. In this case, the basic training data may have been classified in advance according to data types, and the data determination models may have been classified in advance according to data types. For example, the basic training data may have been classified in advance according to various criteria, such as regions where the training data has been created, times at which the training data has been created, sizes of the training data, genres of the training data, creators of the training data, kinds of objects in the training data, etc.

Also, the model learner 1310-4 may learn the data determination model by using a learning algorithm including error back-propagation or gradient descent.

Also, the model learner 1310-4 may learn the data determination model through, for example, supervised learning using training data as an input value. Also, the model learner 1310-4 may learn the data determination model through, for example, unsupervised learning that finds criterion for determining a situation by itself learning a kind of data required for determining a situation without any supervision. Also, the model learner 1310-4 may learn the data determination model through, for example, reinforcement learning using a feedback informing whether the result of a situation determination according to learning is correct.

Also, after the data determination model is learned, the model learner 1310-4 may store the learned data determination model. In this case, the model learner 1310-4 may store the learned data determination model in a memory of an electronic device including the data recognizer 1320. Or, the model learner 1310-4 may store the learned data determination model in a memory of an electronic device including the data recognizer 1320 which will be described later. Or, the model learner 1310-4 may store the learned data determination model in a memory of a server connected to the electronic device through a wired/wireless network.

In this case, the memory in which the learned data determination model is stored may store, for example, a command or data related to at least another component of the electronic device, together. Also, the memory may store software and/or a program. The program may include, for example, a kernel, middleware, an application programming interface (API), and/or an application program (or "application"), etc.

The model evaluator 1310-5 may input evaluation data to the data determination model, and when the result of recognition output from the evaluation data fails to satisfy predetermined criterion, the model evaluator 1310-5 may instruct the model learner 1310-4 to perform learning again. Herein, the evaluation data may be predetermined data for evaluating the data determination model.

For example, the evaluation data may include at least one pair of pair images.

For example, when the model evaluator 1310-5 determines that a number or portion of evaluation data showing incorrect results of recognition among the results of recognition of the learned data determination model with respect to the evaluation data exceeds a predetermined threshold value, the model evaluator 1310-5 may determine that the learned data determination model has failed to satisfy the predetermined criterion. For example, it is assumed that the predetermined criterion is defined as 2%. In this case, when the learned data determination model outputs wrong recognition results with respect to more evaluation data than 20 evaluation data among a total of 1000 evaluation data, the model evaluator 1310-5 may determine that the learned data determination model is improper.

Meanwhile, when there are a plurality of learned data determination models, the model evaluator 1310-5 may determine whether each learned data determination model satisfies the predetermined criterion, and determine a leaned data determination model satisfying the predetermined criterion as a final data determination model. In this case, when a plurality of learned data determination models satisfy the predetermined criterion, the model evaluator 1310-5 may determine a predetermined learned data determination model or a predetermined number of learned data determination models among the plurality of learned data determination models in evaluation score order as a final data determination model.

Meanwhile, at least one of the data acquirer 1310-1, the pre-processor 1310-2, the training data selector 1310-3, the model learner 1310-4, and the model evaluator 1310-5 in the data learner 1310 may be manufactured in the form of at least one hardware chip and mounted on the electronic device. For example, at least one of the data acquirer 1310-1, the pre-processor 1310-2, the training data selector 1310-3, the model learner 1310-4, and the model evaluator 1310-5 in the data learner 1310 may be manufactured in the form of a dedicated hardware chip for AI or as a part of a typical general-purpose processor (e.g., CPU or application processor) or a graphic dedicated processor (e.g., GPU) and mounted on various electronic devices as described above.

Also, the data acquirer 1310-1, the pre-processor 1310-2, the training data selector 1310-3, the model learner 1310-4, and the model evaluator 1310-5 may be mounted on a single electronic device or on different electronic devices. For example, a part of the data acquirer 1310-1, the pre-processor 1310-2, the training data selector 1310-3, the model learner 1310-4, and the model evaluator 1310-5 may be included in the electronic device, and the other part may be included in a server.

Also, at least one of the data acquirer 1310-1, the pre-processor 1310-2, the training data selector 1310-3, the model learner 1310-4, and the model evaluator 1310-5 may be implemented as a software module. When at least one of the data acquirer 1310-1, the pre-processor 1310-2, the training data selector 1310-3, the model learner 1310-4, and the model evaluator 1310-5 is implemented as a software module (or, a program module including an instruction), the software module may be stored in non-transitory computer readable media. Also, in this case, the at least one software module may be provided by OS or by a predetermined application. Or, a part of the at least one software module may be provided by OS and the other part may be provided by the predetermined application.

Figure 11:
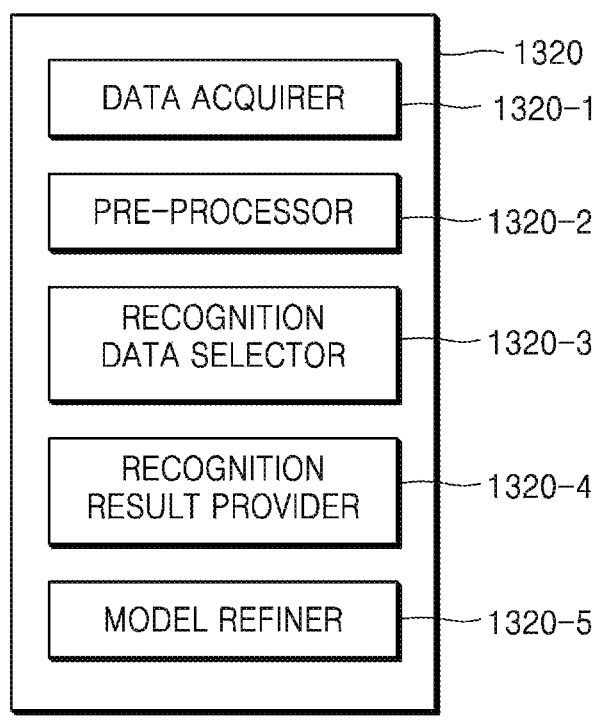
FIG. 11 is a block diagram of a data recognizer according to an embodiment.

FIG. 11 is a block diagram of the data recognizer 1320 according to an embodiment.

Referring to FIG. 11, the data recognizer 1320 according to an embodiment may include a data acquirer 1320-1, a pre-processor 1320-2, a recognition data selector 1320-3, a recognition result provider 1320-4, and a model refiner 1320-5.

The data acquirer 1320-1 may acquire data required for determining a situation, and the pre-processor 1320-2 may pre-process the acquired data such that the data acquired for determining the situation is used. The pre-processor 1320-2 may process the acquired data into a predetermined format such that the recognition result provider 1320-4 which will be described later uses the data acquired for determining the situation.

The recognition data selector 1320-3 may select data required for determining a situation from among the pre-processed data. The selected data may be provided to the recognition result provider 1320-4. The recognition data selector 1320-3 may select the entire or a part of the pre-processed data according to predetermined criterion for determining a situation. Also, the recognition data selector 1320-3 may select data according to criterion determined in advance by learning of the model learner 1310-4 which will be described later.

The recognition result provider 1320-4 may apply the selected data to a data determination model to determine a situation. The recognition result provider 1320-4 may provide the result of recognition according to a purpose of recognition of data. The recognition result provider 1320-4 may use data selected by the recognition data selector 1320-3 as an input value to apply the selected data to the data determination model. Also, the result of recognition may be determined by the data determination model.

For example, the result of recognition of an input image may be provided as text, an image, or an instruction (e.g., an application execution instruction, a module function execution instruction, etc.). The recognition result provider 1320-4 may apply an image to the data determination model to convert the image into an image satisfying a predetermined visibility reference value, and provide the converted image.

For example, the recognition result provider 1320-4 may provide a display function execution instruction as the result of recognition to cause the display 1210 to output the converted image.

The model refiner 1320-5 may refine the data determination model based on an evaluation on the result of recognition provided by the recognition result provider 1320-4. For example, the model refiner 1320-5 may provide the result of recognition provided by the recognition result provider 1320-4 to the model learner 1310-4 to cause the model learner 1310-4 to refine the data determination model.

Meanwhile, at least one of the data acquirer 1320-1, the pre-processor 1320-2, the recognition data selector 1320-3, the recognition result provider 1320-4, and the model refiner 1320-5 in the data recognizer 1320 may be manufactured in the form of at least one hardware chip and mounted on the electronic device. For example, at least one of the data acquirer 1320-1, the pre-processor 1320-2, the recognition data selector 1320-3, the recognition result provider 1320-4, and the model refiner 1320-5 may be manufactured in the form of a dedicated hardware chip for AI or as a part of a typical general-purpose processor (e.g., CPU or application processor) or a graphic dedicated processor (e.g., GPU) and mounted on various electronic devices as described above.

Also, the data acquirer 1320-1, the pre-processor 1320-2, the recognition data selector 1320-3, the recognition result provider 1320-4, and the model refiner 1320-5 may be mounted on a single electronic device or on different electronic devices. For example, a part of the data acquirer 1320-1, the pre-processor 1320-2, the recognition data selector 1320-3, the recognition result provider 1320-4, and the model refiner 1320-5 may be included in the electronic device and the other part may be included in a server.

Also, at least one of the data acquirer 1320-1, the pre-processor 1320-2, the recognition data selector 1320-3, the recognition result provider 1320-4, and the model refiner 1320-5 may be implemented as a software module. When at least one of the data acquirer 1320-1, the pre-processor 1320-2, the recognition data selector 1320-3, the recognition result provider 1320-4, and the model refiner 1320-5 is implemented as a software module (or a program module including an instruction), the software module may be stored in non-transitory computer readable media. Also, in this case, the at least one software module may be provided by OS or by a predetermined application. Or, a part of the at least one software module may be provided by OS and the other part may be provided by the predetermined application.

Figure 12:
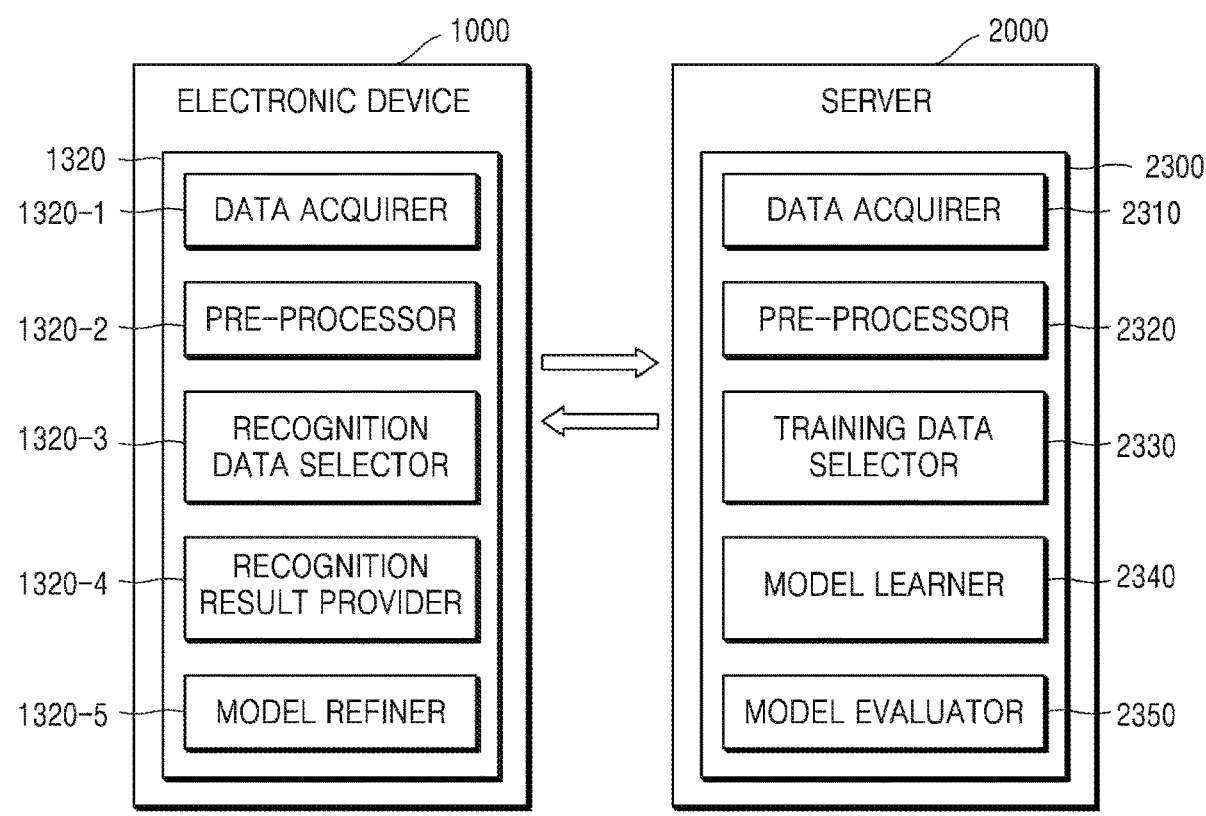
FIG. 12 is a diagram for describing an example in which an electronic device according to an embodiment interworks with a server to learn and recognize data.

FIG. 12 is a diagram for describing an example in which the electronic device 1000 according to an embodiment interworks with a server 2000 to learn and recognize data.

Referring to FIG. 12, the server 2000 may learn criterion for increasing visibility of an image, and the electronic device 1000 may determine a situation based on the result of learning by the server 2000.

In this case, a model learner 2340 of a data learner 2300 of the server 2000 may perform a function of the data learner 1310 shown in FIG. 10. The data learner 2300 includes a data acquirer 2310, a pre-processor 2320, a training data selector 2330, a model learner 2340, and a model evaluator 2350, which may correspond to the data acquirer 1310-1, the pre-processor 1310-2, the training data selector 1310-3, the model learner 1310-4, and the model evaluator 1310-5, respectively, of data learner 1310, and a full description thereof will not be repeated. The model learner 2340 of the server 2000 may learn criterion related to what data will be used to increase visibility of an image and how to increase visibility of an image using data. The model learner 2340 may acquire data that is to be used for learning, and apply the acquired data to a data determination model which will be described later, thereby learning criterion for increasing visibility of an image.

Also, the recognition result provider 1320-4 of the electronic device 1000 may apply data selected by the recognition data selector 1320-3 to a data determination model created by the server 2000 to increase visibility of an image. For example, the recognition result provider 1320-4 may transmit data selected by the recognition data selector 1320-3 to the server 2000, and request the server 2000 to apply the data selected by the recognition data selector 1320-3 to a determination model to increase visibility of the image. Also, the recognition result provider 1320-4 may receive an image whose visibility has been increased by the server 2000 from the server 2000.

Or, the recognition result provider 1320-4 of the electronic device 1000 may receive a determination model created by the server 2000 from the server 2000, and increase visibility of the image by using the received determination model. In this case, the recognition result provider 1320-4 of the electronic device 1000 may apply the data selected by the recognition data selector 1320-3 to a data determination model received from the server 2000 to increase visibility of the image.

An embodiment may be implemented in the form of a computer-readable recording medium including an instruction that is executable by a computer, such as a program module that is executed by a computer. The computer-readable recording medium may be an arbitrary available medium which is able to be accessed by a computer, and may include a volatile or non-volatile medium and a separable or non-separable medium. Further, the computer-readable recording medium may include a computer storage medium and a communication medium. The computer storage medium may include volatile and non-volatile media and separable and non-separable media implemented using an arbitrary method or technology for storing information such as a computer readable instruction, a data structure, a program module, or other data. The communication medium may generally include a computer readable instruction, a data structure, a program module, other data of a modulated data signal such as a carrier wave, or another transmission mechanism, and include an arbitrary information transmission medium.

Also, in the present specification, the term "unit" may be a hardware component such as a processor or a circuit, and/or a software component that is executed by a hardware component such as a processor.

It should be understood that the above descriptions of the present disclosure are merely for illustrative purposes, and therefore, it will be apparent that those skilled in the art can readily make various modifications thereto without changing the technical spirit and essential features of the present disclosure. Thus, it should be understood that the embodiments described above are merely for illustrative purposes and not for limitation purposes in all aspects. For example, each component described as a single type may be implemented in a distributed form, and likewise, components described in a distributed form may be implemented in a combined form.

The scope of the present disclosure is shown by the claims to be described below rather than the detailed description, and it is to be construed that the meaning and scope of the claims and all modifications or modified forms derived from the equivalent concept thereof are encompassed within the scope of the present disclosure.

The invention claimed is:

1. An electronic device comprising:
  a camera configured to capture an outside image of a vehicle;
  a memory storing one or more instructions; and
  a processor configured to execute the one or more instructions stored in the memory,
  wherein the processor executes the one or more instructions to:
    determine, from the captured image, at least one object for estimating lane information, wherein the lane information comprises lines that divide a road on which the vehicle is driving along lanes,
    determine a road area from the captured image,
    acquire information about a number and determined different ratios of lanes of the road on which the vehicle is driving, based on information of the road at a location corresponding to position information of the vehicle,
    estimate a lane width from the captured image, based on a distance between the determined at least one object and the vehicle, the determined road area, a vanishing point of the image, and the acquired information about the number of lanes,
    divide the road area by the acquired number of lanes by using the vanishing point of the image as a pivot and the estimated lane width to estimate the lane information of the road, and
    output guide information for guiding driving of the vehicle based on the estimated lane information,
  wherein the lane information further comprises a first lane width of a first lane on which the vehicle is traveling and a lane position of the vehicle in the first lane,
  wherein the guide information comprises a warning of a danger of lane departure,
  wherein the information about the number and determined different ratios of lanes of the road on which the vehicle is driving is acquired based on at least one of global positioning system (GPS) position information of the vehicle, a local navigation included in the vehicle, or information stored in advance in the electronic device, and
  wherein different respective widths of the lanes of the road are estimated based on the respective determined ratios of the lanes.

2. The electronic device of claim 1, wherein the processor further executes the one or more instructions to:
  acquire an artificial intelligence learning model based on a result obtained by using a plurality of images for a same subject to learn a relationship between the plurality of images for the same subject;
  convert the captured image by using the acquired artificial intelligence learning model such that the captured image has visibility that is greater than or equal to a predetermined value; and
  determine the at least one object for estimating the lane information from the converted image.

3. The electronic device of claim 1, wherein the determined at least one object for estimating lane information comprises at least one among a guard rail, another vehicle driving ahead, or another vehicle driving behind.

4. The electronic device of claim 1, wherein the processor further executes the one or more instructions to:
  determine a driving center line of the vehicle;
  estimate, when the determined at least one object includes a first front vehicle located on the driving center line, the first lane width of the first lane on which the vehicle is driving from the image, based on a distance between the first front vehicle and the vehicle and a vehicle width of the first front vehicle; and
  estimate the lane information from the image based on the estimated first lane width, the vanishing point of the image, and the determined driving center line of the vehicle.

5. The electronic device of claim 4, wherein the processor further executes the one or more instructions to:
estimate, when the determined at least one object includes a second front vehicle not located on the driving center line, a second lane width of a second lane on which the second front vehicle is driving, based on a distance between the second front vehicle and the driving center line, a distance between the second front vehicle and the vehicle, and a vehicle width of the second front vehicle; and
estimate the lane information based on the estimated second lane width, the vanishing point of the image, and a driving center line of the second front vehicle.

6. The electronic device of claim 1, further comprising a display displaying the captured image,
wherein the processor further executes the one or more instructions to:
create the guide information based on the estimated lane information and a driving speed of the vehicle, and
synthesize the created guide information with the road area of the captured image to display a result of the synthesizing on the display.

7. The electronic device of claim 1, wherein the processor further executes the one or more instructions to:
determine whether the position of the vehicle in the first lane is included in a predetermined range, based on the estimated lane information; and
output the guide information based on a result of the determining of the lane position of the vehicle in the first lane.

8. The electronic device of claim 1, wherein the guide information is output in a form of displaying at least one of a text, an image, or an animation.

9. A method comprising:
acquiring an outside image of a vehicle;
determining, from the acquired image, at least one object for estimating lane information, wherein the lane information comprises lines that divide a road on which the vehicle is driving along lanes;
determining a road area from the acquired image;
acquiring information about a number and determined different ratios of lanes of the road on which the vehicle is driving, based on information of the road at a location corresponding to position information of the vehicle;
estimating a lane width from the acquired image, based on a distance between the determined at least one object and the vehicle, the determined road area, a vanishing point of the image, and the acquired information about the number of lanes;
dividing the road area by the acquired number of lanes by using the vanishing point of the image as a pivot and the estimated lane width to estimate the lane information of the road; and
outputting guide information for guiding driving of the vehicle based on the estimated lane information,
wherein the lane information further comprises a first lane width of a first lane on which the vehicle is traveling and a lane position of the vehicle in the first lane,
wherein the guide information comprises a warning of a danger of lane departure, and
wherein the information about the number and determined different ratios of lanes of the road on which the vehicle is driving is acquired based on at least one of global positioning system (GPS) position information of the vehicle, a local navigation included in the vehicle, or information stored in advance, and
wherein different respective widths of the lanes of the road are estimated based on the respective determined ratios of the lanes.

10. The method of claim 9, further comprising:
learning a relationship among a plurality of images for a same subject by using the plurality of images for the same subject; and
converting the acquired image based on a result of the learning such that the acquired image has visibility that is greater than or equal to a predetermined value,
wherein the determining of the at least one object for estimating the lane information from the acquired image comprises:
determining the at least one object for estimating the lane information from the converted image.

11. The method of claim 9, further comprising:
determining a driving center line of the vehicle,
wherein when the determined at least one object includes a first front vehicle located on the driving center line, and
wherein the estimating of the lane information of the road on which the vehicle is driving from the image based on the distance between the determined at least one object and the vehicle and the vanishing point of the image comprises:
estimating, from the image, the first lane width of the first lane on which the vehicle is driving, based on the distance between the first front vehicle and the vehicle and a vehicle width of the first front vehicle, and
estimating the lane information from the image, based on the estimated first lane width, the vanishing point of the image, and the determined driving center line of the vehicle.

12. The method of claim 11, wherein when the determined at least one object includes a second front vehicle not located on the driving center line, the estimating of the lane information from the image, based on the distance between the determined at least one object and the vehicle and the vanishing point of the image comprises:
estimating, from the image, a second lane width of a second lane on which the second front vehicle is driving, based on a distance between the second front vehicle and the driving center line, a distance between the second front vehicle and the vehicle, and a vehicle width of the second front vehicle; and
estimating the lane information from the image based on the estimated second lane width, the vanishing point of the image, and a driving center line of the second front vehicle.

13. The method of claim 9, wherein the outputting of the guide information for guiding driving of the vehicle, based on the estimated lane information, comprises:
creating the guide information based on the estimated lane information and a driving speed of the vehicle; and
synthesizing the created guide information with the road area of the acquired image to display a result of the synthesizing.

14. The method of claim 9, wherein the outputting of the guide information for guiding driving of the vehicle, based on the estimated lane information, comprises:
determining whether the position of the vehicle in the first lane is included in a predetermined range, based on the estimated lane information; and outputting the guide information based on a result of the determining of the lane position of the vehicle in the first lane.

15. A computer-readable recording medium storing a program for executing the method of claim 9, on a computer.

* * * * *